H. R. HUGHES.
SINGLE DISK DRILL.
APPLICATION FILED FEB. 24, 1914.

1,124,243.

Patented Jan. 5, 1915.

Witnesses:
Geo. R. Ladson.
C. M. Badger.

Inventor,
Howard R. Hughes.
By Bakewell & Church, Attys.

UNITED STATES PATENT OFFICE.

HOWARD R. HUGHES, OF HOUSTON, TEXAS.

SINGLE-DISK DRILL.

1,124,243.         Specification of Letters Patent.         Patented Jan. 5, 1915.

Application filed February 24, 1914. Serial No. 820,670.

*To all whom it may concern:*

Be it known that I, HOWARD R. HUGHES, a citizen of the United States, residing at Houston, Texas, have invented a certain new and useful Improvement in Single-Disk Drills, of which the following is a full, clear, and exact description, such as will enable others skilled in the art to which it pertains to make and use the same.

This invention relates to rotary boring drills of the type that are used for drilling deep holes in comparatively soft formations, such, for example, as gumbo, shale, hard clay and soft rock.

The main object of my present invention is to provide an efficient and serviceable rotary boring drill that comprises only a few parts which are so designed and arranged that ample clearance is provided for the disintegrated material that is flushed out of the hole by the water which is introduced through the hollow drill stem to which the head of the drill is connected, thereby reducing the tendency of the disintegrated material to pack in the hole and thus interfere with the operation of the drill.

Another object is to provide a rotary boring drill of the type mentioned in which the cutting means consists of a single cutter of substantially disk-shape that cuts a circular hole without leaving a core standing at the bottom of the hole, said cutter being arranged in a substantially upright or vertical position at one side of the head so that the advancing sharp edge of same will shear off the material at the side of the hole, and the head of the drill on which the cutter is rotatably mounted being provided with one or more ducts for the flushing water which are so disposed that neither the cutter nor other parts on the head impede the flow or discharge of the flushing water from the head.

Other objects and desirable features of my invention will be hereinafter pointed out.

Figure 1:
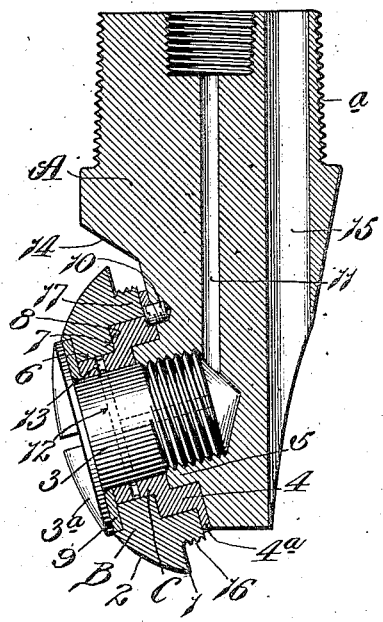
Figure 2:
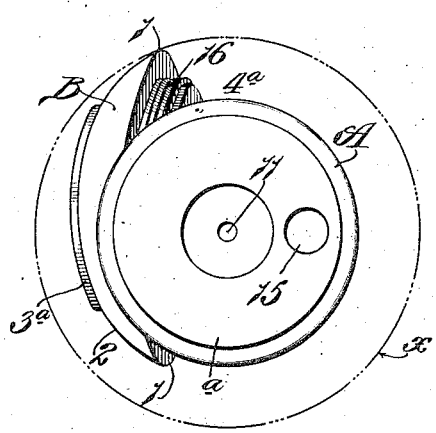

Figure 1 of the drawings is a vertical sectional view of a drill constructed in accordance with my invention; and Fig. 2 is a top plan view of said drill.

Referring to the drawings which illustrate the preferred form of my invention, A designates the head of the drill which preferably consists of a block of metal provided at its upper end with a screw-threaded portion *a* for connecting the head to the hollow drill stem or tubular-shaped operating member, not shown, through which water is introduced into the hole so as to flush out the disintegrated material. A single cutter B of substantially disk-shape, is rotatably mounted on the head A in such a manner that it crushes and disintegrates the material when the head A rotates, the cutter B being arranged in an upright or substantially vertical position at one side of the head but inclined slightly so that the lower portion of same inclines inwardly toward the vertical axis of the head and the upper portion inclines outwardly, as shown in Fig. 1. The cutter B is provided with a comparatively sharp cutting edge 1 that shears off the material from the side of the hole, as shown in Fig. 2, when the drill is in operation, and said cutter is also preferably provided with a crushing surface 2 that lies back of or beyond the cutting edge 1 so as to crush and disintegrate the material at the bottom of the hole that lies outside of the zone where the sharp edge of the cutter digs into the bottom of the hole. Various means may be employed for connecting the cutter B to the head, but I prefer to mount said cutter substantially horizontally disposed spindle 3 that inclines downwardly, as shown in Fig. 1, and which is offset slightly, or set a trifle to one side of the longitudinal center of the head, as shown in Fig. 2, so that the rear side or edge portion of the cutter will not drag against the side of the hole, which is indicated by the circle *x* in Fig. 2 when the advancing edge of the cutter is shearing off the material at the side of the hole. The spindle 3 is preferably screwed into the head, and is provided at its outer end with an enlarged head 3ᵃ that laps over the outer face of the cutter B, but I do not wish it to be understood that my invention is limited to this specific means for holding the cutter on the head, for any other suitable mounting could be provided for the cutter without departing from the spirit of my invention. In view of the great strains that the cutter is subjected to when it is in service, it is desirable to have an exceptionally large bearing area for the cutter, and in the embodiment of my invention herein shown this is obtained by means of a bushing C of bronze or other suitable material that is mounted on the spindle 3 and which is provided with a relatively large cylindrical-shaped bearing portion 4 that surrounds a boss or flange 5 on the head A through which the spindle 3 projects, said bushing also having a cylindrical-shaped bearing portion 6 of smaller diameter. The cutter B is provided with an inner bore of two different diameters that conform to the shape and diameter of the two bearing portions 4 and 6 on the bushing C, and it is also provided with a shoulder or thrust bearing 7 that bears against a coöperating shoulder or thrust bearing 8 on the bushing C, the inner end of the cutter bearing against a flange 4ª on the bushing C that acts as a thrust bearing. If desired, a washer 9 can be arranged between the outer end of the cutter B and the enlarged head 3ª on the spindle that laps over the cutter, said washer being preferably set in a recess formed in the outer face of the cutter, as shown in Fig. 1. A dowel-pin or screw 10 in the head A that projects into an opening formed in the inner end of the bushing C holds the bushing stationary with respect to the head and prevents it from rotating with the cutter. The cutter B is kept thoroughly lubricated when the drill is in service by means of lubricant supplied through a duct 11 in the head that leads to ducts 12 in the spindle that communicate with openings 13 in the bushing C, as shown in Fig. 1.

A pocket 14 is preferably formed in one side of the head for receiving the cutter B so as to partially protect the cutter and prevent the sharp cutting edge 1 of same from catching on projections in the whole when the drill is being withdrawn from the hole, the top wall of said pocket projecting laterally over the upper edge of the cutter B, as shown in Fig. 1. The opposite side of the head is preferably inclined inwardly, and the duct or opening 15 that is formed in the head for the flushing water, preferably terminates in said inclined face so that the wash water or flushing water will be discharged from one side of the head at a point remote from the cutter, thereby preventing the flow of the flushing water from being impeded by the cutter.

The cutter B is arranged at one side of the vertical axis of the head, as shown in Fig. 1, and, consequently, the cutting edge 1 and the crushing surface 2 of the cutter B do not act on the material at the center of the bottom of the hole. In the drill herein shown the material at the center of the bottom of the hole is disintegrated by a cutting surface 16 on the cutter B which lies intermediate the sharp edge 1 of said cutter and the vertical center of the head A of the drill, said cutting surface 16 being formed on the outer cylindrical surface of a flange 17 at the inner end of the cutter B of less diameter than the diameter of the cutting edge 1 of the cutter, as shown in Fig. 1. The specific design of the cutting surface 16 is immaterial so far as my invention is concerned, and while I have herein illustrated said cutting surface as consisting of a spiral groove extending around the outer face of the reduced inner end portion 17 of the cutter, I do not wish it to be understood that my invention is limited to such a construction for the portion 17 of the cutter could be provided with any other suitable type of cutting surface; nor do I wish it to be understood that this feature of my invention is limited to use on a cutter that forms the entire cutting means of a rotary drill for it could be embodied in a cutter that forms only one element or part of the cutting means of a rotary drill.

In operation, the sharp edge 1 of the cutter B shears off the material from the side of the hole and remains sharp by constantly rubbing against the side of the hole, and the portion 2 of the cutter crushes and disintegrates the material at the bottom of the hole. The small core that remains at the center of the bottom of the hole is crushed and ground up progressively by the cutting surface 16 of the cutter which lies between the sharp edge 1 of the cutter and the vertical center or axis of the drill head A. The shearing strains on the spindle 3 are reduced to a minimum, owing to the inclined position of the spindle and to the shape of the cutter which is so formed that the weight imposed on the drill head tends to force the cutter inwardly against the thrust bearing surfaces 4ª and 8 on the bushing, and there is very little tendency for the cutter to wear away quickly or become dull, owing to the fact that it is mounted on the head in such a manner that the rear side portion of same does not drag against the side of the hole when the drill is in operation.

In a drill of the construction above-described ample clearance is provided for the disintegrated material that is flushed out of the hole by the water introduced through the hollow drill stem, owing to the fact that the drill comprises only a single cutter and a head which is so proportioned that it does not clog up the hole. Consequently, there is little tendency for the disintegrated material to pack in the hole and thus interfere with the operation of the drill. The drill comprises only a few rugged parts which are strong enough to successfully withstand the strains to which they are subjected when the drill is in service. And another desirable feature of such a drill is the exceptionally large bearing surface that is provided for the cutter by means of the bushing C which is also equipped with end thrust bearings for the cutter. The particular way that the flushing water is introduced into the hole, namely, from one side of the head of the drill and at a point remote from the cutter, is novel, and tends to eliminate packing of the disintegrated material, owing to the fact that neither the cutter nor any parts on the head impede the flow or discharge of the flushing water. The particular design of the cutter is novel, and while such a cutter is particularly adapted for use in a drill provided with a single cutter, it could, of course, be used on a drill provided with a plurality of cutters. The drill is very efficient for gumbo, shale, and other comparatively soft formations, and as the cutter is thoroughly lubricated and is so constructed and arranged that the action of same on the material tends to keep it sharp and in workable condition, the drill can be used for a long period without withdrawing it from the hole.

Having thus described my invention, what I claim as new and desire to secure by Letters Patent is:

1. A rotary boring drill provided with a comparatively sharp-edged cutter which is arranged in an upright or substantially vertical position at one side of the head so that the sharp advancing edge of same shears off the material at the side of the hole and digs into the bottom of the hole, and a cutting surface on said cutter lying between the sharp edge of the cutter and the vertical axis of the drill head for disintegrating the material at the center of the bottom of the hole.

2. A rotary boring drill provided with a comparatively sharp-edged cutter which is arranged in an upright or substantially vertical position at one side of the head so that the sharp advancing edge of same shears off the material at the side of the hole and digs into the bottom of the hole, and means on said cutter for disintegrating the material at the center of the bottom of the hole which lies inside of the zone described on the bottom of the hole by the sharp edge of said cutter.

3. A rotary boring drill consisting of a head, and a single cutter of substantially disk-shape rotatably mounted on a downwardly inclined spindle that projects laterally from the head, said cutter being provided with a comparatively sharp cutting edge that acts on the side of the hole and digs into the bottom of the hole, a crushing surface lying outside of said sharp edge for disintegrating the material at the bottom of the hole lying outside of the path described by said sharp edge, and a cutting portion for disintegrating the material at the center of the bottom of the hole.

4. A rotary boring drill consisting of a head, and a single cutter of substantially disk-shape rotatably mounted on the head in an upright position with its upper portion inclined outwardly, said cutter having a shearing edge that acts on the side of the hole, and a crushing portion and a cutting portion arranged on opposite sides of said shearing edge that act on the bottom of the hole so as to form a round hole without leaving a core standing at the center of the bottom of the hole.

5. A rotary boring drill provided with a cutter that rotates about an axis which inclines downwardly and outwardly from the head, said cutter having a comparatively sharp cutting edge that shears off the material from the side of the hole and a cutting portion located between said edge and the vertical axis of the head of the drill which disintegrates the material at the center of the bottom of the hole.

6. A rotary boring drill provided with a cutter that has a comparatively sharp cutting edge that shears off the material at the side of the hole and a cutting portion located between said cutting edge and the vertical axis of the head of the drill for acting on the bottom of the hole, said cutter also having a portion that lies outside of said edge for acting on the material at the bottom of the hole which lies outside of the zone where said sharp edge digs into the bottom of the hole.

7. A rotary boring drill provided with a substantially disk-shaped cutter that is arranged in an inclined position on a spindle that inclines downwardly and outwardly from the head of the drill, said cutter having a tapered portion whose large end terminates in a comparatively sharp edge that acts on the side wall of the hole and a reduced portion on said cutter lying at the opposite side of said sharp edge and provided with a cutting surface.

8. A rotary boring drill comprising a head provided at one side with a pocket, and a substantially disk-shaped cutter arranged in an upright position in said pocket with its upper portion inclined outwardly and having portions that act on the side and on the bottom of the hole including the material at the center of the bottom of the hole.

9. A rotary boring drill consisting of a head provided at one side with a downwardly inclined side face, said head having a water-course or passageway for the flushing water that terminates in said inclined side face, and a substantially rotatable cutter arranged in an upright position on the opposite side of the head on a spindle that inclines downwardly and projects outwardly from the head.

10. A rotary boring drill consisting of a head provided at one side with a downwardly inclined side face, said head having a water-course or passageway for the flushing water that terminates in said inclined side face, and a rotatable cutter arranged in an upright position on the opposite side of the head with its upper portion inclined outwardly, said cutter having a comparatively sharp shearing edge, a tapered portion that lies beyond said edge and also a reduced cutting portion that projects inwardly from said sharp edge toward the longitudinal axis of the drill.

11. A rotary boring drill consisting of a substantially wedge-shaped head provided in one of its inclined side faces with an undercut pocket and its other side face with a discharge opening for the flushing water, a substantially disk-shaped cutter arranged in an inclined position in said pocket and provided with a comparatively sharp cutting edge, a crushing portion on said cutter lying beyond said sharp edge, and a reduced cutting portion on the inner side of the cutter.

In testimony whereof I hereunto affix my signature in the presence of two witnesses, this 16" day of February 1914.

HOWARD R. HUGHES.

Witnesses:
L. A. GODBOLD,
C. E. REED.